(12) United States Patent
Yellin et al.

(10) Patent No.: US 6,898,252 B1
(45) Date of Patent: May 24, 2005

(54) IQ MISMATCH CANCELLATION

(75) Inventors: Daniel Yellin, Raanana (IL); Amir Francos, Tel Aviv (IL)

(73) Assignee: Intel Corporation, Santa Clara, CA (US)

(*) Notice: Subject to any disclaimer, the term of this patent is extended or adjusted under 35 U.S.C. 154(b) by 704 days.

(21) Appl. No.: 09/621,388

(22) Filed: Jul. 21, 2000

(51) Int. Cl.[7] .................. H04K 1/02; H04L 25/03; H04L 25/49
(52) U.S. Cl. ................ 375/296; 375/298; 375/235; 375/261; 375/285; 455/63.1
(58) Field of Search ................ 375/296–298, 375/284, 285, 278, 261, 235; 455/63.1, 126, 63

(56) References Cited

U.S. PATENT DOCUMENTS

| | | | |
|---|---|---|---|
| 5,351,016 A | * 9/1994 | Dent | 332/103 |
| 5,404,378 A | * 4/1995 | Kimura | 375/296 |
| 5,732,333 A | * 3/1998 | Cox et al. | 455/126 |
| 6,208,698 B1 | * 3/2001 | Marchesani et al. | 375/298 |
| 6,535,560 B1 | * 3/2003 | Masenten | 375/261 |
| 6,587,514 B1 | * 7/2003 | Wright et al. | 375/296 |
| 2002/0015450 A1 | * 2/2002 | Ratto | 375/261 |

OTHER PUBLICATIONS

Cavers, J.; "Amplifier Linearization Using a Digital Predistorter with Fast Adaptation and Low Memory Requirements"; IEEE Trans. On Vehicular Technology; vol. 39; No. 4; Nov. 1990; pp. 374–382.

Cavers, J.; "New Methods for Adaptation of Quadrature Modulators and Demodulators Amplifier Linearization Circuits"; IEEE Trans. On Vehicular Technology; vol. 46; No. 3; Aug. 1997; pp.707–716.

Sundström, L. et al.; "Quantization Analysis and Design of a Digital Predistortion Linearizer for RF Power Amplifiers"; IEEE Trans. On Vehicular Technology; vol. 45; No. 4; Nov. 1996; pp. 707–719.

Lohtia,A. et al.; "An Adapt Digital Techniquefor Compensatingfor Analog QuadratureModulator/Demodulator Impairments"; Proc. IEEE Pac Rim Conf.; 1993; pp. 447–450.

* cited by examiner

Primary Examiner—Phuong Phu
(74) Attorney, Agent, or Firm—Pearl Cohen Zedek Latzer, LLP

(57) ABSTRACT

A method of assigning values to parameters for IQ mismatch cancellation. The method includes providing values to a processing path of a communication device, passing the provided values through an IQ modulator, at least one non-linear element and an IQ demodulator, to produce distorted values, and estimating at least one parameter for cancellation of IQ mismatch effects of the communication device responsive to the provided values and to the distorted values.

28 Claims, 6 Drawing Sheets

IQ MISMATCH CANCELLATION

BACKGROUND OF THE INVENTION

Many transmitters transmit digital information values that are generated in base band. The base band digital values are modulated onto a carrier high frequency signal and the combined signal is amplified before its transmission. The base band values may be complex values having real and imaginary components which are traditionally referred to as I and Q components, respectively. In the modulation of the base band signal and amplification of the modulation signal, inaccuracies are introduced. These inaccuracies may cause the transmitter to interfere with signals on carrier frequencies allocated to other transmitters and therefore should be at least partially canceled by the transmitter.

One of these inaccuracies, which is due mainly to an IQ modulator of the transmitter, is referred to as IQ mismatch which is generally modeled by the following equation:

$$\bar{V}_q = \begin{pmatrix} I_q \\ Q_q \end{pmatrix} = \begin{bmatrix} \cos(\varphi) & \sin(-\varphi) \\ b\sin(-\varphi) & b\cos(\varphi) \end{bmatrix} \begin{pmatrix} I_d \\ Q_d \end{pmatrix} \quad (1)$$

in which $I_d$, $Q_d$ are the real and imaginary input base band values of the modulator, $I_q$, $Q_q$ are the real and imaginary base band equivalent output values of the modulator and ($\varphi$,b) are constants which describe the IQ mismatch of the modulator. This inaccuracy may be compensated for by a mismatch correction multiplier. It is required, however, to estimate the parameters of the mismatch correction multiplier.

Another inaccuracy is due to the non-linearity of the amplification of the transmitted signal. The non-linearity may be compensated for by a predistorter.

BRIEF DESCRIPTION OF FIGURES

Particular embodiments of the invention will be described with reference to the following description of the embodiments, in conjunction with the figures, wherein identical structures, elements or parts which appear in more than one figure are labeled with a same or similar number in all the figures in which they appear, and in which.

DETAILED DESCRIPTION OF EMBODIMENTS

Figure 1A:
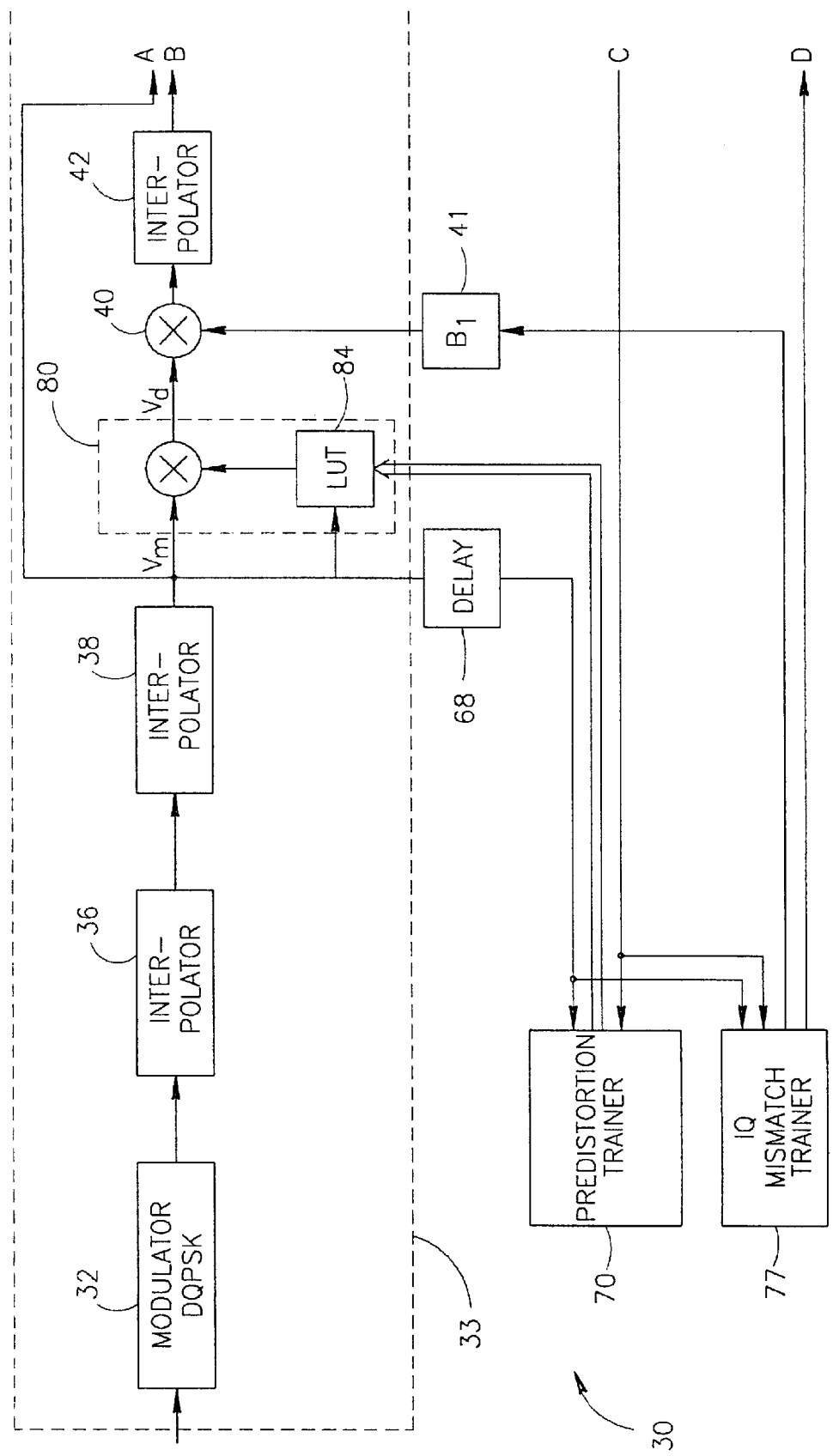
FIGS. 1A and 1B are a schematic block diagram of a transmitter, in accordance with an embodiment of the present invention.
Figure 1B:
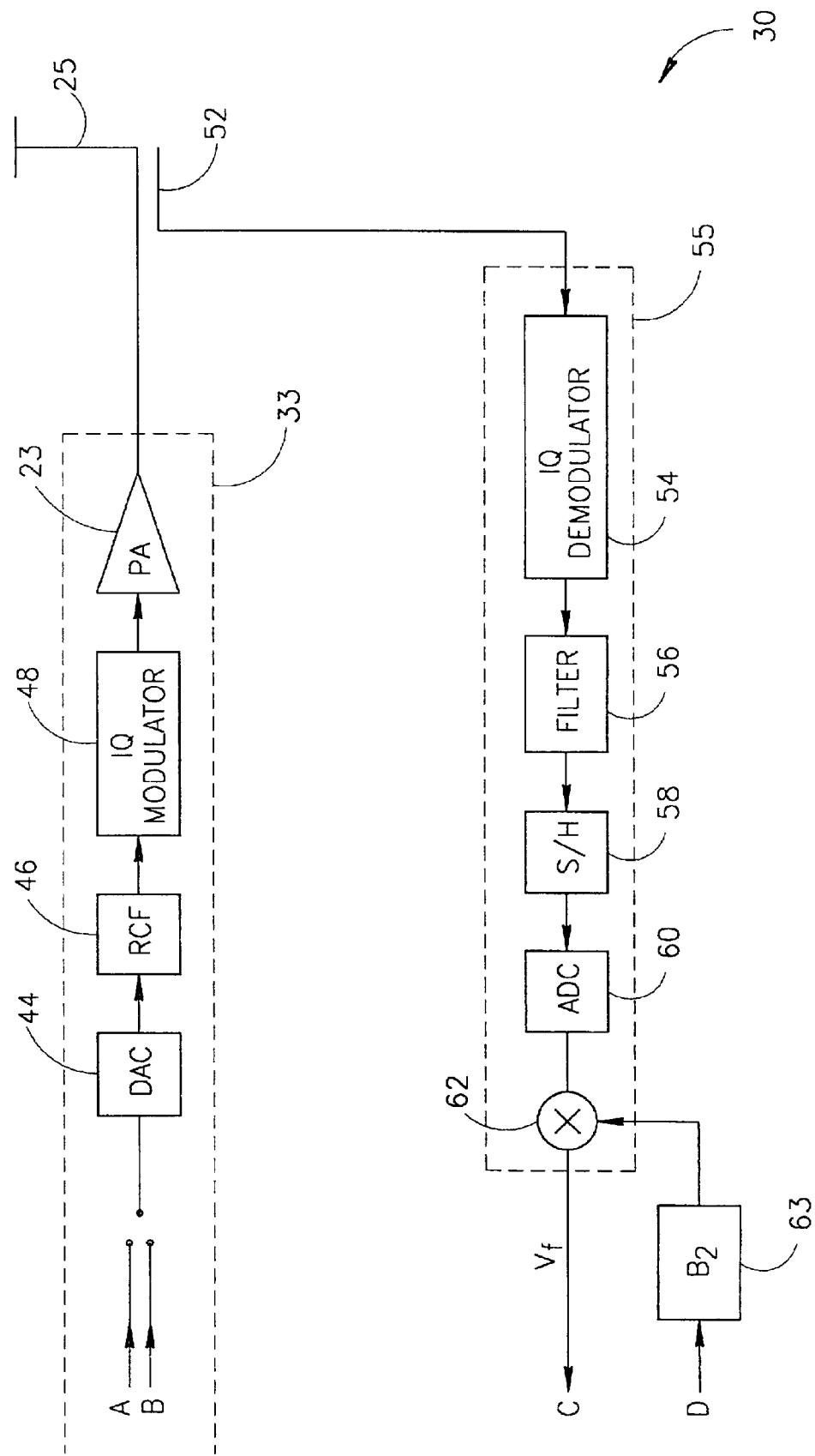

FIGS. 1A and 1B are a schematic block diagram of a transmitter 30, in accordance with an exemplary embodiment of the present invention. Transmitter 30 comprises a transmission modulation path 33 which receives bits and shapes them for transmission over an antenna 25. In an exemplary embodiment of the invention, modulation path 33 includes a $$\frac{\pi}{4}$$

DQPSK (Differential Quadrature Phase Shift Keying) modulator 32, a first interpolator 36, a second interpolator 38, a predistorter 80, a mismatch multiplier 40, a third interpolator 42, a digital to analog converter (DAC) 44, a reconstruction filter (RCF) 46, an IQ modulator 48 and a power amplifier 23.

A directional coupler 52 senses the signals transmitted by amplifier 23 and passes them through a reverse conversion unit 55 which substantially reverses the operation of an ending portion of modulation path 33, bringing the signals back to a state in which they can be compared to the signals provided by second interpolator 38. In some embodiments of the invention, IQ modulator 48 and conversion unit 55 may be included in a single, optionally standard, chip. It is noted that in some embodiments of the invention, transmitter 30 does not have any additional reverse conversion paths which convert, to base band form, signals from after modulator 48 and/or DAC 44.

In an exemplary embodiment, reverse conversion unit 55 comprises an IQ demodulator 54 (corresponding to modulator 48), a filter 56, a sample and hold (S/H) 58, and an analog to digital converter (ADC) 60 (which together correspond to DAC 44) and a mismatch multiplier 62 (corresponding to multiplier 40).

In some embodiments of the invention, the signals from reverse conversion unit 55 are provided to a predistorter trainer 70 and to a mismatch trainer 77 together with the samples from second interpolator 38. In some embodiments of the invention, the samples from second interpolator 38 are passed through a delay unit 68 which delays them for substantially the time required for the samples to pass through path 33 and return through reverse conversion unit 55. Thus, trainers 70 and 77 receives pairs of values representing the same sample, a vector $V_m$ from interpolator 38 and a vector $V_f$ from after the return through conversion unit 55.

Predistorter trainer 70 uses vectors $V_m$ and $V_f$ to monitor values of a look up table (LUT) 84 of predistorter 80 such that the predistorter compensates for non-linearities of modulation path 33, especially of amplifier 23. The compensation is performed, for example, by multiplying the values provided to IQ modulator 48 by respective values from LUT 84. In an exemplary embodiment, trainer 70 operates using a two stage method, including an initial value assignment stage and an adaptive stage. During the initial stage trainer 70 accumulates a plurality of pairs of values which represent the non-linearity and optionally uses the accumulated pairs in creating a polynomial model of the non-linearities. The values of LUT 84 are adjusted based on the polynomial model. Mismatch trainer 77 assigns digital values to correction 2×2 matrices B1 (41) and B2 (63) which are optionally used by mismatch multipliers 40 and 62 in canceling the mismatch effects of modulator 48 and demodulator 54, respectively. In some embodiments of the present invention, mismatch trainer 77 determines the values to be assigned to matrices 41 and 63 based on the received pairs of vectors $V_m$ and $V_f$. In some embodiments of the invention, the digital values in LUT 84 are close to the values required to compensates for the non-linearities, before mismatch trainer 77 begins to operate. In these embodiments, mismatch trainer 77 may be planned to operate based on the assumption that the mismatch errors in transmitter 30 are relatively small.

Figure 2:
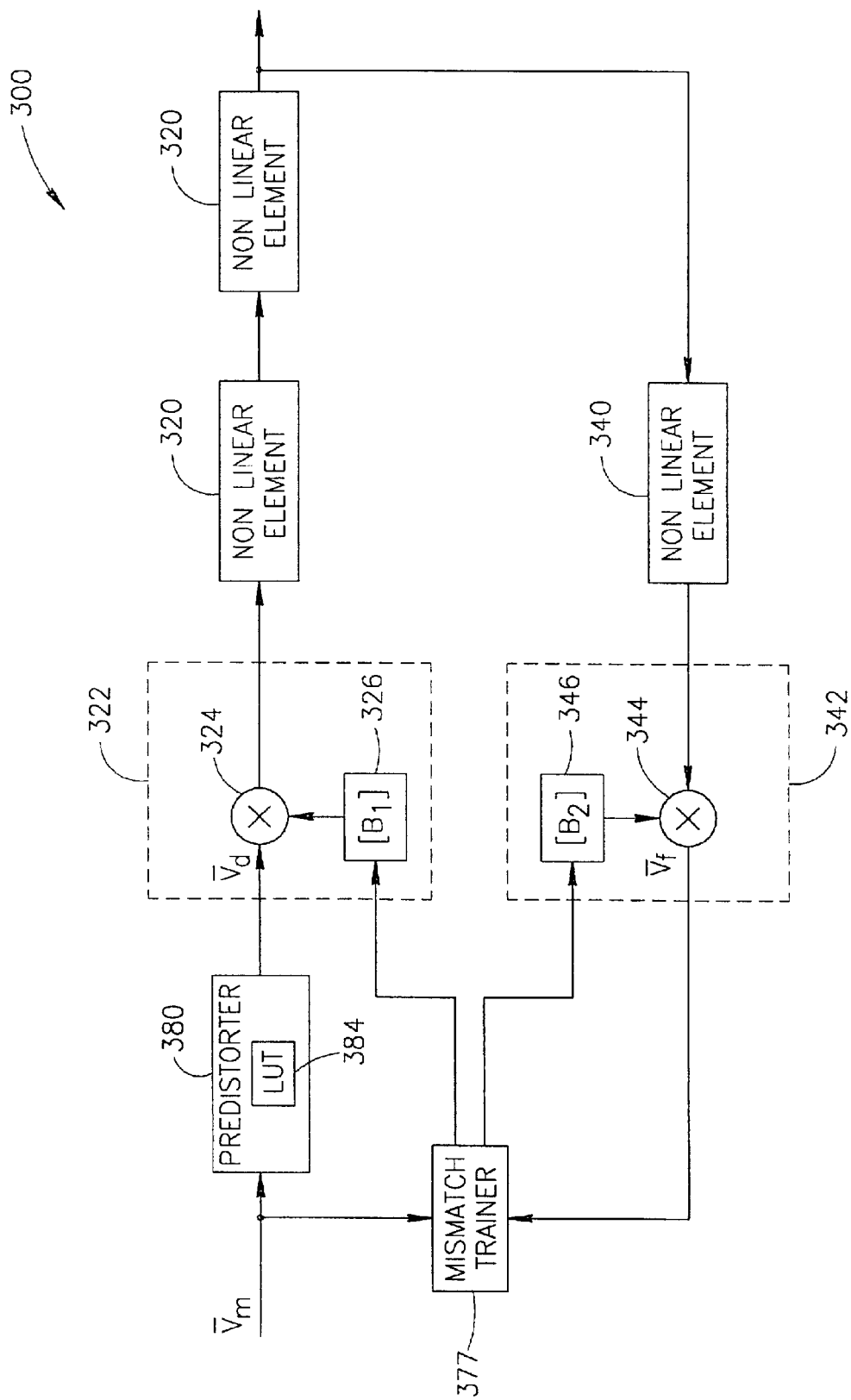
FIG. 2 is a schematic functional block diagram of an apparatus which includes mismatch cancellation circuits, in accordance with an embodiment of the present invention.

FIG. 2 is a schematic functional block diagram of elements relevant to mismatch cancellation in an apparatus 300 which includes mismatch cancellation circuits, in accordance with an embodiment of the present invention. Apparatus 300 may be for example a communication device, such as transmitter 30 of FIGS. 1A and 1B, a receiver or any other apparatus which suffers from IQ mismatch. A vector of signals $V_m = (I_m, Q_m)$, formed of a real part $I_m$ and an imaginary part $Q_m$ is provided to a sequence of non-linear elements 320, 330 and 340 which includes a signal processing path. One or more of the non-linear elements, e.g., elements 320 and 340, cause IQ mismatch distortions which are corrected by respective IQ correction units 322 and 342. The distortions of non-linear elements 320 and 340 are modeled in accordance with equation (1), with unknown parameters $(\phi_1, b_1)$ and $(\phi_2, b_2)$, respectively, replacing $(\phi b)$. Non-linear elements 320 and 340, may be, for example, IQ modulator 48 and IQ demodulator 54 of transmitter 30.

In some embodiments of the invention, IQ correction units 322 and 342 comprise respective multipliers 324 and 344 which correct the distortions of the respective modulator/demodulator. Multipliers 324 and 344 multiply the signals passing through them by matrices 326 and 346, respectively, which have the form:

$$B_i = \frac{1}{\cos(2\theta_i)} \begin{bmatrix} \cos(\theta_i) & \beta_i \sin(\theta_i) \\ \sin(\theta_i) & \beta_i \cos(\theta_i) \end{bmatrix} i = 1, 2 \qquad (2)$$

in which $(\theta_1, \beta_1, \theta_2, \beta_2)$ are parameters which are set by a mismatch trainer 377. In some embodiments of the invention, parameters $(\theta_1, \beta_2, \theta_2, \beta_2)$ are estimated, as described hereinbelow, to bring their values as close as possible to the distortions of non-linear elements 320 and 340, represented in the following description by matrices $A_i$. When parameters $(\theta_1, \beta_1) i = 1, 2$ are substantially equal to $$\left(\varphi_i, \frac{1}{b_i}\right),$$

respectively, the distortions of non-linear elements 320 and 340 are substantially completely compensated for, as $A_i B_i \approx I$ (I being the 2×2 identity matrix) for i=1,2.

Optionally, the vectors $\overline{V}_m$ are predistorted by a predistorter 380 into $\overline{V}_d = (I_d, Q_d)$ using fixed values from a LUT 384, before the vectors are provided to non-linear element 320.

In some embodiments of the invention, non-linear element 330 has a complex-valued base band equivalent transfer function which is optionally modeled by:

$$G_{PA} = \begin{bmatrix} g_I & -g_Q \\ g_Q & g_I \end{bmatrix} \qquad (3)$$

in which $g_I$, $g_Q$ are the real and imaginary components, respectively, of the complex valued gain of non-linear element 330. It is noted that generally, $g_I$, $g_Q$ depend on the input signal amplitude of non-linear element 330.

Thus, non-linear element 340 provides at its output vectors $\overline{V}_f = (I_f, Q_f)$ which are related to vectors $V_d$ according to:

$$V_f = B_2 A_2 \, G_{PA} A_1 B_1 V_d \qquad (4)$$

In some embodiments of the invention, as described hereinbelow in detail with respect to FIGS. 3 and 4, mismatch trainer 377 iteratively adjusts the values of parameters $(\theta_1, \beta_1, \theta_2, \beta_2)$ based on vector pairs $(V_m, V_f)$ handled by apparatus 300 during adjustment periods. In each of one or more repetitions of the iterative adjustment performed by mismatch trainer 77, the trainer estimates a correction value of one or more of parameters $(\theta_1, \beta_1, \theta_2, \beta_2)$ which minimizes the mismatch error not corrected by multipliers 324 and 344. It is noted that the vectors $V_f$ received by mismatch trainer 77 are altered relative to the respective vectors $V_d$ by a plurality of non-linear elements which have complex valued transfer functions, e.g., a modulator, a demodulator and a power amplifier. In some embodiments of the invention, the non-linear elements comprise RF elements.

Figure 3:
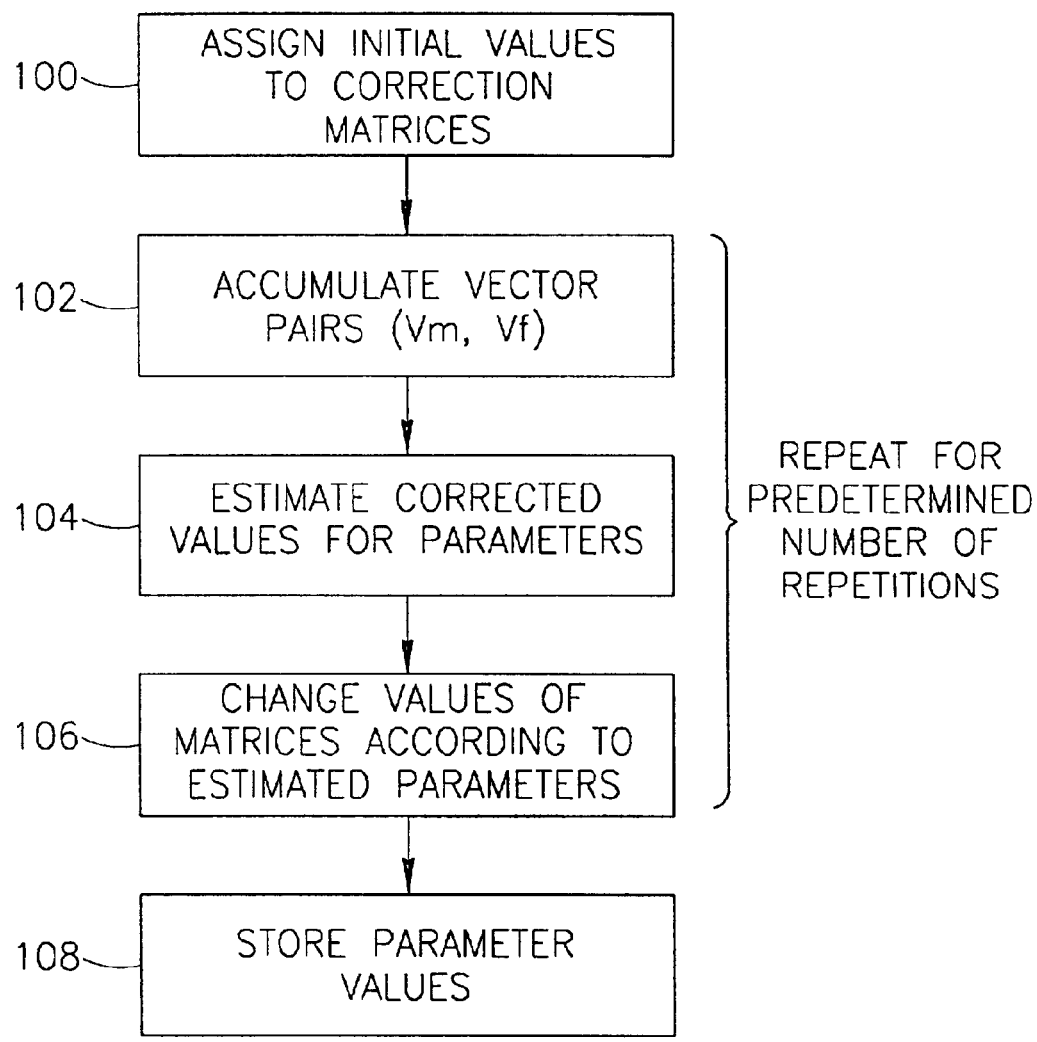
FIG. 3 is a flowchart of the actions performed by a mismatch trainer, in accordance with an embodiment of the present invention.

FIG. 3 is a flowchart of the actions performed by mismatch trainer 377, in accordance with some embodiments of the present invention. When apparatus 300 is operated, optionally after various initialization procedures described hereinbelow, mismatch trainer 377 assigns (block 100) initial values to matrices 326 and 346, i.e., assigns values to parameters $(\theta_1, \beta_1, \theta_2, \beta_2)$, referred to cumulatively as $\underline{\Phi}$. In an embodiment of the invention, the initial values of matrices 326 and 346 are predetermined values which are calibrated in the manufacturing process of apparatus 300. Alternatively or additionally, the initial values are the values most recently calculated the last time apparatus 300 was operated. Further alternatively or additionally, the initial values are taken as a weighted average of values calculated in previous operations of apparatus 300 and/or of factory calibrated values.

After the initial values of matrices 326 and 346 are assigned (100), mismatch trainer 3377 accumulates (102) a predetermined number of vector pairs $(V_m, V_f)$ of signals handled by apparatus 300 and combines them into combined vectors denoted by $\underline{V_f}$ and $\underline{V_m}$, respectively. In some embodiments of the invention in which apparatus 300 comprises a transmitter, the predetermined number of accumulated pairs $(V_m, V_f)$ comprises the pairs of a single transmission slot, which in an exemplary embodiment includes 140 pairs $(V_m, V_f)$. Mismatch trainer 377 then estimates (104) corrected values of parameters $\underline{\Phi} = (\theta_1, \beta_1, \theta_2, \beta_2)$ which minimize the cost function:

$$C(\underline{\Phi}) = |\underline{V_f}(\underline{\Phi})^j - K\underline{V_m}^j|^2 \qquad (5)$$

(in which K is a desired gain of signals at the output of non-linear element 330) for the accumulated vector pairs $(V_m, V_f)$. An optional method for estimating the corrected values is described below with reference to FIG. 4. The estimated values of parameters $\underline{\Phi} = (\theta_1, \beta_1, \theta_2, \theta_2)$ are then used to change (106) the values of matrices 326 and 346.

In some embodiments of the invention, cost functions other than defined by equation (5) are used, e.g., cost functions with other distance definitions than $|x|^2$, such as the absolute size of the difference vector or the maximal difference among the accumulated pairs $(V_m, V_f)$.

In some embodiments of the invention, the accumulation (102), estimation (104) and value assignment (106) are repeated for a predetermined number of repetitions. In an exemplary embodiment of the invention, the accumulation (102), estimation (104) and value assignment are repeated for about 10 repetitions. The number of repetitions may depend on the processing power of a processor performing the tasks of mismatch trainer 377 and the time required for the processor to handle tasks other than IQ mismatch cancellation. Alternatively, the accumulation (102), estimation (104) and value assignment (106) are repeated until a sufficient accuracy is achieved, for example, until the cost function described by equation (5) is beneath a predetermined level.

Alternatively to adjusting all of parameters $(\theta_1,\beta_1,\theta_2,\beta_2)$ concurrently, during some or all of the repetitions of accumulation (102), estimation (104) and value assignment (106) only a sub group of parameters $(\theta_1,\beta_1,\theta_2,\beta_2)$ are adjusted while others are kept constant during that repetition. In one embodiment of the invention, each parameter is adjusted in separate repetitions and all the other parameters are kept constant. In an exemplary embodiment of the invention, during a first sequence of one or more repetitions, parameters $(\theta_1,\beta_1)$ are adjusted and during a second sequence of one or more repetitions, parameters $(\theta_2,\beta_2)$ are adjusted. Optionally, additional repetitions are performed thereafter, in which parameters $(\theta_1,\beta_1)$ and/or $(\theta_2,\beta_2)$ are re-adjusted, for example, alternately. In an exemplary embodiment of the present invention, the total number of repetitions are divided equally between the different parameters. Alternatively, more repetitions are performed for a first group of parameters than for a second group of parameters, for example, when the inaccuracy in one of the elements causing the IQ mismatch (e.g., non-linear element 340) is larger than the inaccuracy in another element which causes the mismatch.

It is noted that the groups of parameters adjusted in different repetitions may include common parameters from $(\theta_1,\beta_1,\theta_2,\theta_2)$.

In an embodiment of the invention, each parameter is adjusted separately until the value of cost equation (5) goes down by at least a predetermined percent and/or a predetermined number of repetitions are performed. Mismatch trainer 377 then moves on to a different parameter until all the parameters are adjusted. Mismatch trainer 377 then re-adjusts the previously adjusted parameters in the same or in a different order, until cost equation (5) reaches a desired level and/or a predetermined number of allowed repetitions has occurred.

After the predetermined number of repetitions have been performed and/or the predetermined cost level is reached, mismatch trainer 377 optionally stores (108) the parameter values to be used in assigning (100) the initial values in a later mismatch training of apparatus 300.

Alternatively to accumulating (102), for each repetition, vector pairs $(V_m,V_f)$ of symbols handled in a single slot, a greater or lesser number of vector pairs $(V_m,V_f)$ may be accumulated for use in each repetition. For example, each repetition may be based on vector pairs of two slots, or half a slot. In some embodiments of the invention, each repetition is performed for a single pair $(V_m,V_f)$. In some embodiments of the invention, different numbers of vector pairs are accumulated for different repetitions. In some embodiments of the invention, a large number of pairs are accumulated for the early repetitions which require relatively large adjustments and a smaller number of pairs is accumulated for later adjustments. Alternatively or additionally, different repetitions are used to adjust different numbers of parameters, and the number of accumulated pairs depends on the number of adjusted parameters.

Figure 4:
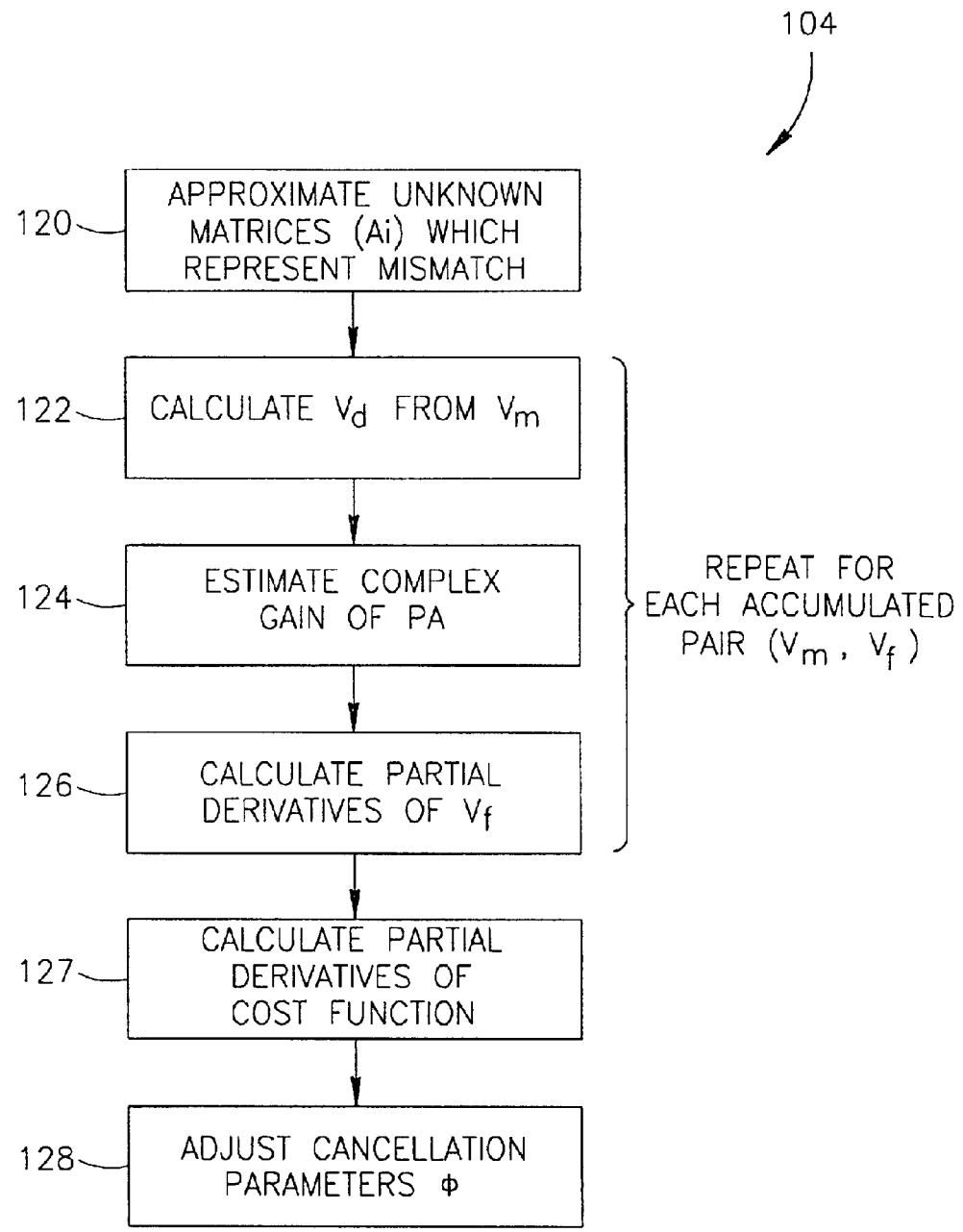
FIG. 4 is a flowchart of the actions performed in estimating corrected parameter values for mismatch cancellation, in accordance with an embodiment of the present invention.

FIG. 4 is a flowchart of the actions performed in estimating (104) corrected values of parameters $\underline{\Phi}=(\theta_1,\beta_1,\theta_2,\beta_2)$, in accordance with an embodiment of the present invention. In embodiments of the invention, mismatch trainer 377 approximates (120) unknown matrices $A_i$ based on the following equation:

$$\hat{A}_i \approx B_i^{-1} = \begin{bmatrix} \beta_i\cos(\theta_i) & -\beta_i\sin(\theta_i) \\ -\sin(\theta_i) & \cos(\theta_i) \end{bmatrix} \quad (6)$$

in accordance with the assumption that the current values of parameters $(\theta_1,\beta_1,\theta_2,\beta_2)$ are very close to $$\left(\varphi_1, \frac{1}{b_1}, \varphi_2, \frac{1}{b_2}\right),$$

respectively, and therefore $A_iB_i\approx I$ for $i=1,2$.

In an embodiment of the invention, the above assumption is considered fulfilled when the maximal mismatch of non-linear elements 320 and/or 340 is about $\pm 0.1$ dB and $\pm 1°$, regardless of the values of parameters $(\theta_1,\beta_1,\theta_2,\beta_2)$. Alternatively or additionally, the above assumption is considered fulfilled when the maximal mismatch of non-linear elements 320 and/or 340 is about $\pm 0.3$ dB and $\pm 3°$, regardless of the values of parameters $(\theta_1,\beta_1,\theta_2,\beta_2)$. Further alternatively or additionally, factory measurements of parameters $(\theta_1,\beta_1,\theta_2,\beta_2)$ are performed to a sufficient accuracy such that the above assumption is substantially always true, given the initial values of the parameters. Further alternatively or additionally, the method of FIG. 4 is used even in those cases in which the above assumption is not true.

For each of the accumulated vector pairs $(V_m,V_f)$, mismatch trainer 377 estimates (124) the value of $g_I$, $g_Q$ for matrix $G_{PA}$ (equation (3)). In an embodiment of the invention, for estimating $g_I$, $g_Q$ it is assumed that $A_iB_i\approx 1$ for $i=1,2$. Therefore, equation (4) can be stated as $V_f\approx G_{PA}V_d$, leading to an estimation of $G_{PA}$ given by:

$$\hat{G}_{PA} = \frac{V_f V_d^*}{|V_d|^2} \quad (7)$$

wherein * denotes the complex conjugate operator. In an embodiment of the invention, $V_d$ is calculated (122) from $V_m$ using the contents of LUT 384 (FIG. 2). Alternatively, mismatch trainer 377 receives the respective value of $V_d$ together with each vector pair $(V_m,V_f)$.

In embodiments of the invention, for each vector pair $(V_m,V_f)$, mismatch trainer 377 evaluates (126) the partial derivatives $$\left(\frac{\partial V_f}{\partial \Phi^i}\right)$$

of the accumulated vectors $V_f$, forming a combined vector $$\left(\frac{\partial V_f}{\partial \Phi^i}\right)$$

which includes the partial derivatives of the elements of combined vector $V_f$, according to each one of the desired parameters. In an embodiment of the invention, mismatch trainer 377 evaluates (126) the partial derivatives using the following equations (8a–8d) which show $$\frac{\partial V_f}{\partial \Phi^i}$$

for each of the parameters included in $\underline{\Phi}=(\theta_1,\beta_1,\theta_2,\beta_2)$.

$$\frac{\partial V_f}{\partial \theta_1} = \begin{bmatrix} \cos(\theta_2) & \beta_2\sin(\theta_2) \\ -\sin(\theta_2) & \beta_2\cos(\theta_2) \end{bmatrix} [\hat{G}_1] \begin{bmatrix} -\sin(\theta_1) & \beta_1\cos(\theta_1) \\ \cos(\theta_1) & -\beta_1\sin(\theta_1) \end{bmatrix} \overline{V}_d \quad (8a)$$

$$\frac{\partial V_f}{\partial \beta_1} = \begin{bmatrix} \cos(\theta_2) & \beta_2\sin(\theta_2) \\ \sin(\theta_2) & \beta_2\cos(\theta_2) \end{bmatrix} [\hat{G}_1] \begin{bmatrix} 0 & \sin(\theta_1) \\ 0 & \cos(\theta_1) \end{bmatrix} \overline{V}_d \quad (8b)$$

$$\frac{\partial V_f}{\partial \theta_2} = \begin{bmatrix} -\sin(\theta_2) & \beta_2\cos(\theta_2) \\ \cos(\theta_2) & -\beta_2\sin(\theta_2) \end{bmatrix} [\hat{G}_1] \begin{bmatrix} \cos(\theta_1) & \beta_1\sin(\theta_1) \\ \sin(\theta_1) & \beta_1\cos(\theta_1) \end{bmatrix} \overline{V}_d \quad (8c)$$

$$\frac{\partial V_f}{\partial \beta_1} = \begin{bmatrix} 0 & \sin(\theta_2) \\ 0 & \cos(\theta_2) \end{bmatrix} [\hat{G}_1] \begin{bmatrix} \cos(\theta_1) & \beta_1\sin(\theta_1) \\ \sin(\theta_1) & \beta_1\cos(\theta_1) \end{bmatrix} \overline{V}_d \quad (8d)$$

In equations (8a–8d), matrix $G_1$ is an approximation of $G_1=A_2 G_{PA}A_1$ using the approximations of equations (6) and (7). It is noted that $V_f$ includes a term of the form $$\frac{1}{\cos(2\theta_1)\cos(2\theta_2)}$$

(due to matrices $B_i$) which was ignored in generating equations (8a–8d). In an embodiment of the invention, the effect of this term is included in the step size $\mu$ of the iteration equation (10) described in the following paragraph. Alternatively, in some embodiments, corrected equations taking into account the effect of this term are used instead of equations (8a–8d).

The values of the combined vectors $\underline{V}_f$, $\underline{V}_m$ and $$\left(\frac{\partial V_f}{\partial \underline{\Phi}^i}\right)$$

are used to calculate the correction step of parameters $\underline{\Phi}=(\theta_1,\beta_1,\theta_2,\beta_2)$. In embodiments of the invention, the correction steps of the parameters are calculated by inserting (127) the combined vectors into the partial derivatives of the cost function of equation (5):

$$\frac{\partial C}{\partial \underline{\Phi}^i} = 2\Re\left\{\left(\frac{\partial V_f}{\partial \underline{\Phi}^i}\right)^H [\underline{V}_f - K\underline{V}_m]\right\} \quad (9)$$

in which H denotes the Hermitian operator, and K is a desired gain of signals at the output of non-linear element 330. In some embodiments of the invention, K has a predetermined known value. Alternatively, K is estimated by mismatch trainer 377 (or by any other element of apparatus 300) from pairs $(V_m,V_f)$ using methods known in the art.

In an exemplary embodiment of the present invention, parameters $\underline{\Phi}=(\theta_1,\beta_1,\theta_2,\beta_2)$ are then adjusted (128) using the steepest descent vector iteration equation:

$$\underline{\Phi}^{i+1} = \underline{\Phi}^i - \mu\frac{\partial C}{\partial \underline{\Phi}^i} \quad (10)$$

in which $\mu$ is a predetermined step size.

In an embodiment of the invention, $\mu$ has a constant value throughout the mismatch cancellation of apparatus 300. Alternatively, different values of $\mu$ may be used for at least some of the different repetitions of the method of FIG. 3. In an exemplary embodiment of the invention, a value of $\mu$=0.2 is used in repetitions in which parameters for cancellation of the mismatch of non-linear element 320 are adjusted, and $\mu$=0.31 is used for repetitions in which parameters for cancellation of the mismatch of non-linear element 340 are adjusted. Alternatively or additionally, different values of $\mu$ are used for different pairs $(V_m,V_f)$ during a single repetition, i.e., $\mu$ depends on j in equation (10). Further alternatively or additionally, different values of $\mu$ are used for different ones of parameters $\underline{\Phi}=(\theta_1,\beta_1,\theta_2,\beta_2)$.

In an alternative embodiment of the invention, the estimation (124) of matrix $G_{PA}$ is performed using an average value of all the vectors $(V_m,V_f)$ accumulated 102 during the current repetition. Thus, the estimate of matrix GPA does not depend on a single vector which may be an outlier. In embodiments of the invention of this alternative, for each repetition of accumulation (102), estimation (104) and value assignment (106) the estimation of matrix $G_{PA}$ is performed only once as it does not depend on specific values of $(V_m,V_f)$.

Alternatively to using the steepest descent iteration equation (equation (10)), other iteration equations as are known from optimization theory, such as the conjugate gradient equation and the quasi-Newton equation, may be used. In some embodiments of the invention, the iteration equation used is chosen as a tradeoff between the processing power of apparatus 300 and the required convergence speed of the parameters of matrices 326 and 346. If fast convergence is required and apparatus 300 has a relatively high processing power level, a fast convergence method which requires dense computation (e.g., the quasi-Newton method) may be used. If, however, low processing power utilization is more important than fast convergence, simpler methods, such as the steepest descent method, may be used.

Further alternatively, the assignment of the parameters of matrices 326 and/or 346 is performed in a single batch step, optionally based on a large amount of accumulated signals, or is performed adaptively.

Figure 5:
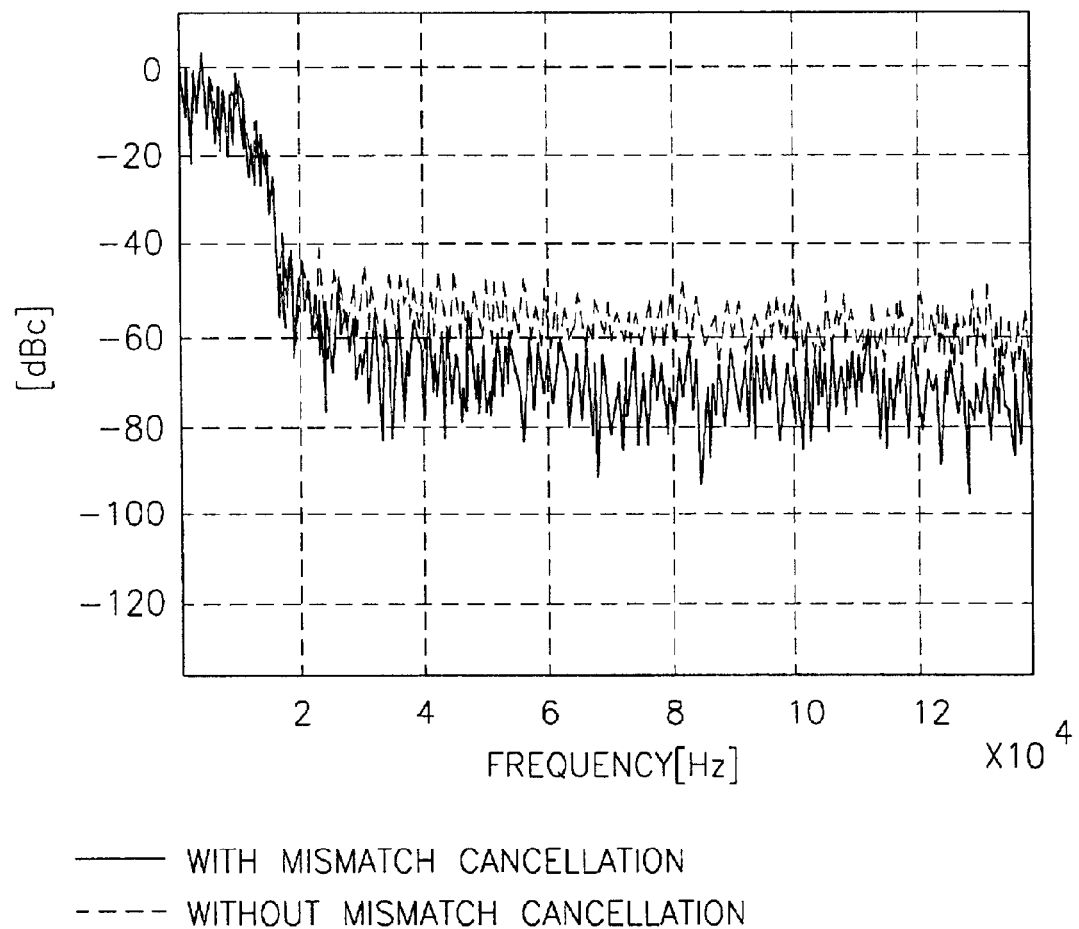
FIG. 5 is a graph comparing the performance of a transmitter in accordance with an embodiment of the present invention and a similar transmitter which may not perform IQ mismatch cancellation.

FIG. 5 is a graph comparing a simulation performance of transmitter 30 using mismatch trainer 77 in accordance with an embodiment of the present invention and a similar transmitter which does not perform IQ mismatch cancellation. The transmission of transmitter 30 is performed on a channel with a bandwidth of ±21 KHz around a carrier frequency. It is required that 50 KHz away from the carrier frequency the transmission strength be sufficiently low so as not to interfere with other transmitters in the vicinity of transmitter 30. For example, the Japanese RCR27C standard requires that the adjacent channel power ratio (ACPR) of transmitters, be lower than −45 dB at 50 KHz away from the carrier frequency and be lower than −60 dB at 100 KHz away from the carrier frequency. As shown in FIG. 5, the ACPR at 50 KHz away from the carrier frequency is −59.5 dB for transmitter 30 and only −51 dB for a transmitter without predistortion. The ACPR at 100 KHz away from the carrier frequency is −66 dB for transmitter 30 and only −56 dB for a transmitter without predistortion.

In some embodiments of the invention, the method of adjustment of the mismatch cancellation parameters described above is performed each time transmitter 30 is switched on. In some embodiments of the invention, the mismatch cancellation parameter adjustment method is performed together with initialization methods of transmitter 30, such as delay adjustment and setting predistortion values. In some embodiments of the invention, when transmitter 30 is first operated, a first transmitted slot of symbols is used for level control and/or delay adjustment of delay unit 68. In some embodiments of the invention, the initial values of parameters $(\theta_1,\beta_1,\theta_2,\beta_2)$ are loaded into matrices 41 and 63 for use in the transmission of the first slot of symbols. Alternatively, the initial values of the parameters are loaded into matrices 41 and 63 after the first slot or at substantially any other time point before the beginning of the mismatch cancellation method. Second and third slots are used for setting the values of LUT 84 and ten following slots are used for IQ mismatch cancellation. Thereafter the transmitted slots are used for continuous adjustment of the values of LUT 84. Alternatively or additionally, the transmitted slots are used in any other order and/or one or more of the transmitted slots are used for a plurality of tasks.

Alternatively to performing the adjustment of the mismatch cancellation parameters in a single stage using current values of predistortion LUT 84, the method of adjustment of the mismatch cancellation parameters is performed in a plurality of stages separated by adjustment stages of the predistortion LUT.

In embodiments of the invention, the mismatch cancellation method is performed on regular data signals generated in the normal use of transmitter 30. These values are chosen without relation to the mismatch cancellation. Alternatively, a special transmission is performed for the mismatch cancellation method. Optionally, the signals of the special transmission are chosen as best suited for mismatch cancellation. In some embodiments of the invention, the signals used in the mismatch cancellation method are at the power level at which transmitter 30 normally operates.

In embodiments of the invention, in addition to, or instead of, performing mismatch cancellation when transmitter 30 is first operated, mismatch cancellation is performed periodically and/or when the transmission conditions of transmitter 30 change substantially.

Although the above described embodiments show mismatch trainer 77 as receiving the values $V_m$, representing the samples before they reach modulator 48, from interpolator 38, in other embodiments of the invention, these values are received from other points before predistorter 80, e.g., from interpolator 36. Alternatively or additionally, mismatch trainer 77 receives vectors $V_d$ from after predistorter 80 instead of, or in addition to, vectors $V_m$ from before predistorter 80. Vectors $V_m$ may be calculated from vectors $V_d$ by dividing by the respective value in LUT 84.

It is noted that some of the units of transmitter 30 may be implemented either in software (on one or more processors) or in hardware. In an exemplary implementation of the embodiment of FIGS. 1A and 1B, modulator 32, interpolators 36 and 38, predistorter 80, mismatch multipliers 40 and 62, matrices 41 and 63, delay unit 68 and trainers 70 and 77 are implemented in software on a single processor, such as a digital signal processor (DSP). In an exemplary embodiment, the remaining elements of transmitter 30 are implemented in hardware. Alternatively, a greater or lesser number of the elements of transmitter 30 are implemented in hardware. For example, in some embodiments, interpolators 36 and/or 38 are also implemented in hardware. In an embodiment of the invention, multiplier 40 is implemented in hardware and multiplier 62 is implemented in software. Alternatively, both multipliers 40 and 62 are implemented in either hardware or in software.

Apparatus 300 on which the present invention is implemented may include wireless or non-wireless transmitters (in base stations, handsets or otherwise), receivers, amplifiers and/or any other apparatus which suffers from IQ mismatch distortions. The present invention is not limited to transmitters of any specific modulation method, but rather may be used with substantially any non-constant envelope modulation methods, including, but not limited to, MPSK, DPSK and QAM. Furthermore, the present invention is not limited to setting parameters of matrix multipliers for cancellation of IQ mismatch effects. Rather, any mismatch adjustment circuitry (e.g., analog multipliers, filters) may be used to cancel the mismatch effect and the parameters of the mismatch adjustment circuitry are adjusted in accordance with the present invention.

It is further noted that mismatch trainer 77 may receive feedback values $V_f$ which passed through elements other than shown in FIG. 2. Particularly, feedback values $V_f$ may pass through additional or less RF elements and/or different elements from power amplifier 23 and/or IQ demodulator 54. Furthermore, mismatch trainer 77 may assign values to more or fewer mismatch multipliers (or other mismatch adjustment circuitry). In an exemplary embodiment of the invention, mismatch trainer 77 assigns values only to a mismatch multiplier of modulator 48.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features described with respect to one embodiment may be used with other embodiments and that not all embodiments of the invention have all of the features shown in a particular figure or described with respect to one of the embodiments. Variations of embodiments described will occur to persons of the art.

Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

What is claimed is:

1. A method comprising:
estimating a first value of a parameter for canceling an in-phase/quadrature phase mismatch of an in-phase/quadrature phase modulator; and
estimating a second value of the parameter for canceling an in-phase/quadrature phase mismatch of an in-phase/quadrature phase demodulator.

2. A method according to claim 1, comprising:
passing the first values through the in-phase and quadrature phase modulator in a processing path of a communication device and passing the second value through the in-phase/quadrature phase demodulator in a reverse path of the communication device.

3. A method according to claim 1, comprising:
estimating the first and second values of the parameter by accumulating a predetermined number of pairs of provided values and respective distorted values and estimating said first and second values from the accumulated pairs.

4. A method according to claim 3, wherein accumulating a predetermined number of pairs comprises accumulating a number of pairs transmitted during a single transmission slot.

5. A method according to claim 1, comprising:
passing values for processing through a multiplier which performs an in-phase/quadrature phase mismatch cancellation based on current values of an estimated parameter.

6. A method according to claim 5, wherein estimating the parameter comprises determining a next step correction of the current value of the estimated parameter.

7. A method according to claim 3, comprising repeating the estimating of the parameter a predetermined number of repetitions.

8. A method according to claim 3, comprising retrieving initial values of parameter.

9. A method according to claim 3, comprising storing an estimated value of the parameter for later use.

10. A method according to claim 1, comprising providing values generated for the in-phase and quadrature phase mismatch cancellation method to a processing path.

11. A method according to claim 10, wherein providing the values to the processing path comprises providing values generated without relation to the in-phase and quadrature phase mismatch cancellation method.

12. A method according to claim 10, comprising: passing the values through a non-linear element.

13. A method comprising:
estimating a complex-valued base band equivalent gain of an amplification unit of a communication device;
approximating values of a matrix representing an in-phase and quadrature phase mismatch effect of the communication device based on an in-phase and quadrature phase mismatch cancellation parameter; and
selecting a value of the in-phase/quadrature phase mismatch cancellation parameter to minimize a cost function which depends on the estimated complex-valued base band equivalent gain and the approximated matrix.

14. A method according to claim 13, wherein estimating the complex valued gain comprises estimating separately for each value passed through the communication device.

15. A method according to claim 13, wherein estimating the complex valued gain comprises estimating once for a plurality of accumulated values passed through the communication device.

16. A communication device comprising;
a trainer to provide an in-phase/quadrature phase mismatch cancellation parameter responsive to values received from both an input and an output of an in-phase/quadrature phase modulator and from an input and an output of an in-phase/quadrature phase demodulator to an in-phase/quadrature phase cancellation unit.

17. A communication device according to claim 16, wherein the trainer does not have inputs from any point between the in-phase/quadrature phase modulator and the in-phase/quadrature phase demodulator.

18. A communication device according to claim 16 comprising a non-linear element between the IQ modulator and the IQ demodulator.

19. A communication device according to claim 16, wherein the trainer comprises;
a determination unit to determine a value of the in-phase/quadrature phase mismatch parameter which minimizes a cost function based on values received from both the in-phase/quadrature phase modulator and the in-phase/quadrature phase demodulator.

20. A communication device according to claim 19, comprising:
two or more cancellation units wherein the determination unit is adapted to determine the in-phase/quadrature phase mismatch parameter of the two or more cancellation units.

21. A communication device according to claim 19, wherein the determination unit is adapted to determine the in-phase/quadrature phase mismatch parameter iteratively.

22. A transmitter comprising:
a mismatch trainer to adjust a value of one or more of an in-phase mismatch parameter and quadrature phase mismatch parameter responsive to values received from both an input and an output of an in-phase/quadrature phase modulator and from an input and an output of an in-phase/quadrature phase demodulator; and
a reverse conversion unit coupled with the mismatch trainer, having a demodulator, a correction matrix and a mismatch multiplier,
wherein the mismatch trainer is able to provide the one or more in-phase and/or quadrature phase parameter as correction values to the correction matrix to be used by the mismatch multiplier to cancel mismatch effects of the demodulator.

23. A transmitter according to claim 22, comprising:
an in-phase/quadrature phase correction unit coupled with the mismatch trainer to adjust signals entering the in-phase/quadrature phase modulator and to cancel mismatch effects of the modulator.

24. A transmitter according to claim 22, wherein the mismatch trainer is adapted to adjust the mismatch parameter iteratively.

25. A transmitter according to claim 22, wherein the mismatch trainer and the in-phase/quadrature phase correction unit are implemented by software on a processor.

26. A method of assigning values to parameters for IQ mismatch cancellation of a transmitter, comprising:
transmitting values by the transmitter;
estimating at least one parameter for cancellation of IQ mismatch effects of the transmitter responsive to the values transmitted during a first period; and
adjusting the at least one parameter estimated responsive to the values transmitted during a first period responsive to values transmitted during a second period, which second period is separated from the first period by a rest period in which the transmitted values are not used to adjust parameters for IQ mismatch cancellation.

27. A method according to claim 26, wherein the values transmitted during the rest period are used for adjusting a predistorter of the transmitter.

28. A method according to claim 27, comprising adjusting the predistorter based on values transmitted before the first period.

* * * * *